(No Model.)
A. LIEBERMAN & W. ROBB.
ELECTRICAL HEATING APPARATUS.
No. 276,840. Patented May 1, 1883.
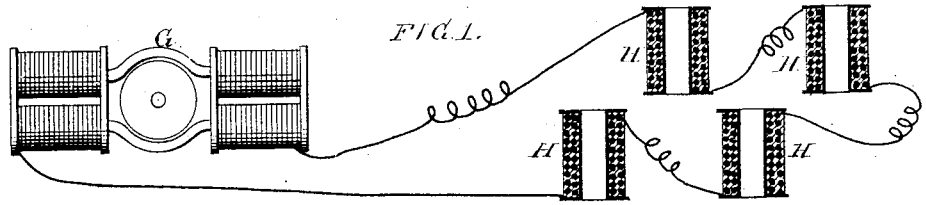
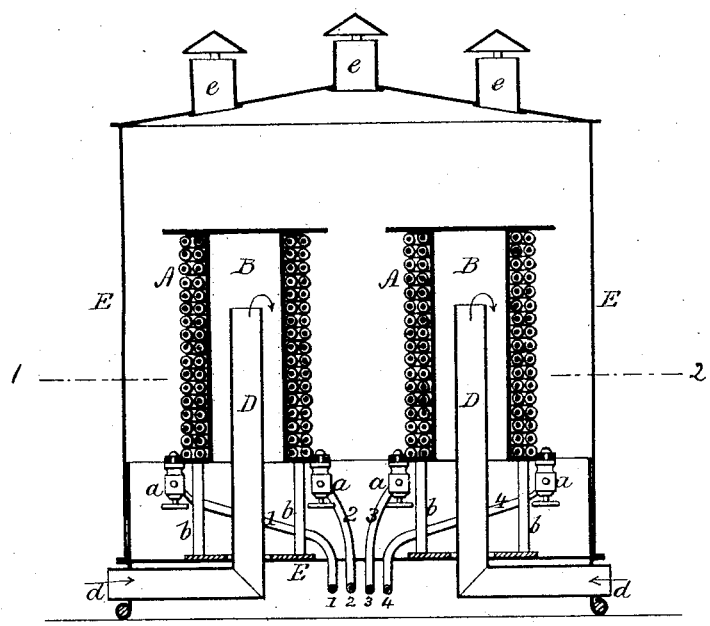
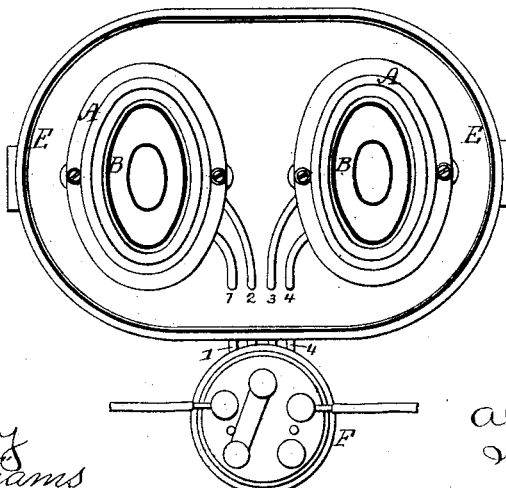
WITNESSES:
Harry Drury
David Williams
INVENTORS.
Albert Lieberman
and
William Robb
by their attys
Howson and Son

UNITED STATES PATENT OFFICE.

ALBERT LIEBERMAN AND WILLIAM ROBB, OF PHILADELPHIA, PA.

ELECTRICAL HEATING APPARATUS.

SPECIFICATION forming part of Letters Patent No. 276,840, dated May 1, 1883.

Application filed February 17, 1883. (No model.)

*To all whom it may concern:*

Be it known that we, ALBERT LIEBERMAN, a subject of the Emperor of Germany, and WILLIAM ROBB, a citizen of the United States, and both residents of Philadelphia, Pennsylvania, have invented an Improved Electrical Heating Apparatus, of which the following is a specification.

Our invention consists of an improved apparatus for utilizing the heat generated by passing a current of electricity through a conductor offering a certain resistance to the current, as more fully described hereinafter.

In the accompanying drawings, Figure 1 is a diagram illustrative of our invention. Fig. 2 is a vertical section of an apparatus made in accordance with our invention; and Fig. 3, a sectional plan on the line 1 2, Fig. 2.

Referring to the diagram Fig. 1, G represents an electric-current generator of any suitable form—say a Siemens dynamo-electric machine. In the working-circuit of the machine we include our heaters H H, each of which consists of a casing provided with inlets and outlets, and containing one or more coils of wire clothed with an incombustible insulator, and wound on a hollow core, preferably of copper, the character of the wire being such that each coil will offer sufficient resistance to the passage of the current to make the coil intensely hot, while the incombustible character of the covering for the wire prevents the burning which would otherwise result. We prefer to use ordinary copper wire wrapped with pure asbestus thread, for we find that this will answer the purpose best. To mix other fibers—such as cotton—with the asbestus destroys its usefulness, as the cotton will burn out under the heat of the wire.

In Figs. 2 and 3 we have illustrated a form of our apparatus which may be used for heating the air of rooms, or, in a modified form, for heating water, cooking, or other heating purposes. One or more coils, A, (two in the present instance,) of copper wire clothed with the incombustible insulator of pure asbestus thread, are wound in superposed layers (two only being shown in the drawings) on hollow copper cores B B, closed at the upper ends, and mounted on legs $b\ b$ on the base-plate of a sheet-metal casing, E. The terminals of these coils are connected to binding-posts $a\ a$, from which conductors 1 2 3 4 lead to a switch, F, Fig. 3, by means of which one or more of the coils A may be thrown into circuit, according to the heat which it is desired to obtain. Immediately below each coil is an L-shaped pipe, D, mounted in the hollow base of the casing E, and having its vertical portion projecting some distance up into the hollow core B, while its other end, $d$, is open to the atmosphere.

When the coils of this apparatus are put in the circuit of a dynamo-electric machine or other generator great heat will be developed in the coils, and a circulation of air through the apparatus will be produced. The cool air entering at $d$ and passing up within the coils will pass down outside the pipes D, around the outside of the coils A, within the casing, and out in a heated state through one or more exit-openings, $e\ e$, in the top of the casing.

By a suitable modification in the construction of the casing E the apparatus may be used for cooking, heating water, or any other purposes for which heat is needed.

Any number of these heaters in different houses, offices, or apartments may be supplied with the necessary electric current from a central station, just as in electric lighting systems.

We are aware that it has heretofore been proposed to use asbestus as an insulator for electric conductors; but this we do not claim.

We claim as our invention—

1. An electric heating apparatus consisting of a casing provided with air inlets and outlets, and containing one or more coils of wire clothed with an incombustible insulator and wound on hollow cores, substantially as specified.

2. The combination of a casing with a coil of wire clothed with an incombustible insulator, and wound on a hollow core mounted within said casing, and an air-inlet pipe extending some distance within said hollow core.

3. The combination of a casing having air-outlets with a hollow core mounted on legs in said casing, and closed at its upper end, and wound with wire clothed with an incombustible insulator, and an air-inlet pipe, D, extending within said hollow core, substantially as set forth.

In testimony whereof we have signed our names to this specification in the presence of two subscribing witnesses.

ALBERT LIEBERMAN.
WILLIAM ROBB.

Witnesses:
HARRY SMITH,
HUBERT HOWSON.